United States Patent

[11] 3,630,583

[72] Inventor Fritz Stahlecker
       Bad Überkingen, Germany
[21] Appl. No. 848,043
[22] Filed Aug. 6, 1969
[45] Patented Dec. 28, 1971
[73] Assignee Spindelfabrik Suben, Schurr, Stahlecker & Grill G.m.b.H.
[32] Priorities Aug. 6, 1968
[33]       Germany
[31]       P 17 85 061.2;
           Mar. 4, 1969, Germany, No. P 19 11 025.9

[54] BEARING SUPPORT OF SPINDLES FOR SPINNING AND TWISTING MACHINES
     10 Claims, 7 Drawing Figs.
[52] U.S. Cl. .................................................. 308/149
[51] Int. Cl. .................................................. F16c 35/08
[50] Field of Search ........................................... 57/135; 308/149, 150, 152, 228

[56]              References Cited
              UNITED STATES PATENTS
1,869,632   8/1932   Sweet .......................... 57/134

FOREIGN PATENTS
8,975      5/1892   Great Britain ............... 57/135
154,136   10/1932   Switzerland .................. 308/149
284,681    4/1931   Italy ............................. 57/135

Primary Examiner—Martin P. Schwadron
Assistant Examiner—Frank Susko
Attorney—Craig, Antonelli and Hill ABSTRACT: A bearing support of spindles for spinning and twisting machines in which the rotating spindle shaft is adapted to be pulled out of the spindle and in which the spindle shaft is supported by a collar bearing absorbing radial pressures and by a footstep bearing absorbing both axial and radial pressures; at least the bearing part of the footstep bearing which absorbs the axial pressures is disengageably arranged in the spindle in such a manner that it can be assembled and disassembled through the bearing bore of the collar bearing; additionally, this bearing part may be provided with engaging surfaces for an assembly tool.

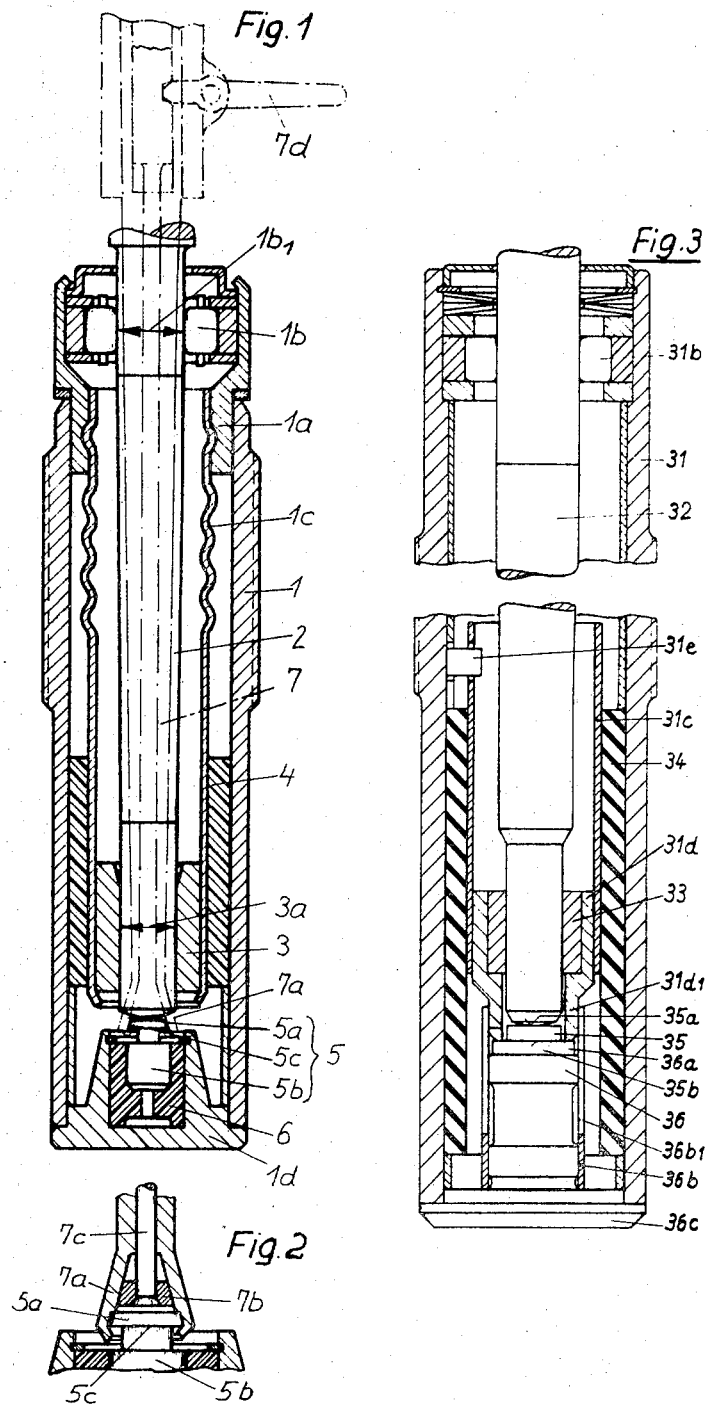

INVENTOR
FRITZ STAHLECKER

BY Craig, Antonelli, Stewart & Hill
ATTORNEYS

ND TWISTING MACHINES

BEARING SUPPORT OF SPINDLES FOR SPINNING AND TWISTING MACHINES

The present invention relates to a bearing support of spindles for spinning and twisting machines with a rotating center or spindle shaft adapted to be pulled out of the spindle, which consists of a collar bearing absorbing radial forces and pressures and of a footstep bearing absorbing axial and radial pressures and forces.

With the known, prior art spindles of this type, the collar bearing is a roller bearing without inner race securely installed in the spindle bearing housing either directly or by way of a bearing head so that the center or spindle shaft abuts directly at the roller bodies. It is achieved thereby, inter alia, that the outer diameter of the spindle housing can be kept relatively small in proximity of the collar bearing and therewith also the diameter of the drive whorl seated on the center or spindle. The footstep bearing of such spindles is, as a rule, a pure friction bearing which, depending on the type of spindle, is guided and/or held in different ways in centering means or damping means and possesses relatively large external dimensions. The disassembly of such footstep bearings out of the spindle in the upward direction or in the downward direction is not provided and also with by far the most spindles is possible only if other spindle parts are at the same time disassembled whereby rigid connections have to be forcibly disconnected or even be destroyed.

Spindles are also known in the prior art in which the disassembly possibility of the footstep bearing in the upward direction is provided, whereby the collar bearing has to be disassembled beforehand, possible together with the bearing head or bearing socket and the centering tubes or the like arranged thereat. Such bearings are seated less accurately and less firmly in the spindles than rigidly or securely installed bearings. Additionally, the collar bearings adapted to be disassembled require more space.

Finally, spindles are also known in the prior art whose spindle housing is closed at the lower end by a removable bottom. If this bottom is removed, then certain spindle parts, among which also footstep bearing parts, can be disassembled in the downward direction. However, such disassemblies of spindle parts in the upward or downward direction as possible with the prior art spindles only with a spindle disassembled from the machine and only by experts whereby one has to proceed in an extraordinarily careful and cleanly manner. In many cases, such disassemblies can and are permitted to be carried out only by the spindle manufacturer.

It has now been discovered that especially in connection with modern high-production, heavy-duty spindles, the loading of the footstep bearing and here again especially of the thrust or step bearing absorbing the axial pressures is very high and that it would therefore be of advantage to be able to examine from time to time and possibly exchange these bearing parts which are subject to high loads and therefore to substantial wear.

Accordingly, it is the aim of the present invention to so dimension and arrange these bearing parts that they can be exchanged without having to accept the described disadvantages which occur, when the spindle has to be opened by disassembly of the collar bearing or by removal of the spindle bottom.

The present invention essentially consists in that at least the bearing parts of the footstep bearing absorbing the axial pressures is detachably or disengageably arranged in the spindle and is adapted to be slipped through the bearing bore of the collar bearing and in that this bearing part is provided with engaging surfaces for an assembly tool. It is possible in this manner to seize and pull out by means of a simple assembly tool, that is adapted to be inserted through the bearing bore of the collar bearing, the footstep bearing part to be removed, and furthermore to reinstall the footstep bearing part with this assembly tool or with similar assembly pliers. This can be realized with a spindle seated in the machine.

In order to obtain the advantages of the detachable or disengageable bearing parts with particularly simple and appropriate means, there may be used as footstep bearing part absorbing the axial pressures, a loose pressure disk supported with radial play which has an external diameter that is smaller at least by a small play than the bearing bore of the footstep bearing part absorbing the radial pressures. As a result thereof, special boltlike extensions, shoulders, grooves, or the like at the disengageable footstep bearing part are obviated and also the support means become more simple. The removal of the pressure disks in accordance with the present invention is possible with simple means since no friction forces have to be overcome in connection therewith. The loose arrangement of the pressure disk additionally produces, as extensive tests of applicant have indicated, the surprising effect of an additional damping of the spindle vibrations. It has been demonstrated in connection therewith that depending on the form of the support surface of the pressure disk for the spindle tip, the damping properties of the spindle can be changed whereby the exchange or the reversing of the pressure disk is possible very rapidly and conveniently. These properties of the loose pressure disk stem from the fact that especially during the occurrence of larger spindle deflections, a sliding movement occurs between the pressure disk and its support whereby the magnitude of the movement and of the friction forces is determined by the general arrangement and the radial play of the pressure disk. Also, the height of the spindle bearing part can be changed or accurately adjusted by a corresponding selection of the pressure disk.

These and further objects, features, and advantages of the present invention will become more obvious from the following description when taken in connection with the accompanying drawing which shows, for purposes of illustration only, several embodiments of a bearing support for spindles in accordance with the present invention, and wherein:

FIG. 1 is a longitudinal cross-sectional view through a spindle in accordance with the present invention whose footstep bearing consists of a bearing bushing and of a thrust or step bearing separate therefrom, whereby the bearing bushing is seated securely in a centering tube and the thrust bearing is arranged adapted to be pulled out in a bush arranged in the bottom of the spindle housing with the assembly pliers being indicated in dash and dot lines;

FIG. 2 is a partial cross-sectional view, on an enlarged scale, illustrating the lower part of the assembly tool engaging behind an annular shoulder of the thrust or step bearing;

FIG. 3 is a longitudinal cross-sectional view through a modified embodiment of a spindle bearing support in accordance with the present invention with a collar bearing constructed as roller bearing and with a footstep bearing having a pressure disk absorbing the axial pressures which is loosely supported on a support bolt secured in the spindle bearing housing by way of an intermediate disk and is guided radially with play in a retaining bush in which is also arranged the bearing sleeve or bushing for the absorption of the radial footstep bearing pressures;

Figure 5:
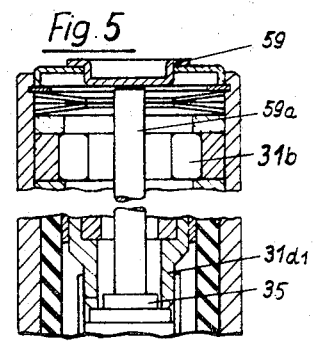
FIG. 5 is a partial, shortened longitudinal cross-sectional view through the spindle bearing support according to FIG. 3, however, with a disassembled spindle or center shaft while the collar bearing opening is closed by a cap and the pressure disk is retained in the footstep bearing by a securing rod.

1, in which, however, is arranged a suction cup instead of a magnet.

Referring now to the drawing wherein like reference numerals are used throughout the various views to designate like parts and more particularly to FIG. 1, reference numeral 1 designates in this figure the spindle housing in which is securely or rigidly seated a bearing head 1a. The collar bearing 1b constructed as roller bearing and the centering tube 1c are rigidly arranged in the bearing head 1a. The spindle or center shaft 2 rotates directly on the roller bodies of the collar bearing 1b. The footstep bearing bushing 3 which radially guides the center or spindle shaft 2, is rigidly secured in the lower part of the centering tube 1c by a flanging or crimping over the latter. The damping means 4 arranged between the centering tube 1c and the spindle housing 1 may be constructed in any known manner, as a spring coil, rubber bush or the like. The thrust or step bearing 5 with thrust bearing plate 5a is seated with the boltlike extension 5b in a bush 6 secured in the bottom 1d of the spindle housing 1. The bottom 1d is securely connected with the spindle housing 1, for example, is welded thereto. The outer diameter of the thrust bearing plate 5a and of the bolt 5b are slightly smaller than the bore 3a of the bearing bush 3 and smaller than the inner diameter $1b_1$ of the collar bearing 1b in such a manner that the step or thrust bearing 5 is adapted to be slipped through the bearing bushing 3 and the collar bearing 1b at least with a sliding fit.

For the disassembly of the thrust or step bearing 5, the center or spindle shaft 2 is removed out of the spindle housing and the assembly tool 7, indicated in dash and dot lines, is inserted through the collar bearing 1b. The lower end of the work tool 7 constructed as slotted expanding pliers is forced over the conical outer surface of the step bearing plate 5a and snaps in underneath the shoulder surface 5c of the step or thrust bearing 5 as illustrated in FIG. 2. The thrust or step bearing 5a can now be pulled in the upward direction out of its bush 6 which may consist of metal or of a more or less elastic synthetic resinous material. The assembly of the step or thrust bearing 5a is possible with the same work tool 7. After pressing-in in the step bearing or thrust bearing 5a into the bush 6, the expanding pliers 7a are disengaged from the step or thrust bearing 5a in that they are expanding by means of an expanding ring 7b. This takes place by pulling up the expanding ring 7b by way of the rod 7c by means of the hand lever 7d.

In FIG. 3, the collar bearing 31b constructed as roller bearing is seated in the spindle housing 31, the spindle or center shaft 32 rotating within the collar bearing 31b. A guide sleeve or bushing 31c is arranged radially movable in the lower portion of the spindle bearing housing but is secured against rotation by a locking projection 31e; a retainer bushing 31d is secured in the guide bushing 31c. The retaining bush 31d carries the bearing sleeve 33 absorbing the radial footstep bearing pressures and includes an offset extension part $31d_1$ provided with a bore that is slightly larger than the bore of the bearing sleeve 33. A radially elastic damping means 34 of any appropriate, known material is disposed between the guide sleeve 31c and the spindle bearing housing 31. The spindle shaft 32 is supported on the pressure disk 35 guided with radial play in the extension part $31d_1$ and consisting of hardened steel or any other particularly suitable material, for example, of hard metal or hard alloy; the pressure disk 35 rests loosely on an intermediate plate 36a consisting of steel and hardened which rests on the support means 36. The intermediate plate 36a is guided without or with only very slight radial play in the centering means 36b constructed in the illustrated embodiment as basket spring. The support means 36 constructed as flange bolt is securely connected with the spindle bearing housing 31 and its lower flange 36c serves simultaneously as housing bottom. The centering effect of the conventional basket spring 36b resides in the fact that its spring legs $36b_1$ separated from one another by slots, elastically absorb the radial movements of the spindle or center shaft 32 by way of the extension part $31d_1$.

Figure 4:
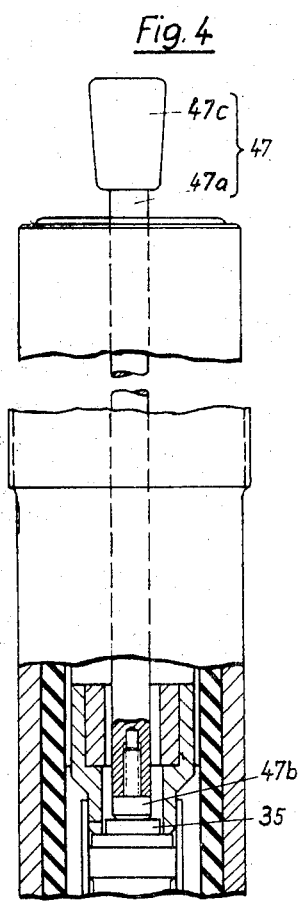
FIG. 4 is a partial elevational view, partly in cross section, of the spindle bearing support according to FIG. 3, however, with a disassembled spindle or center shaft and with an introduced assembly work tool for the removal or insertion of the pressure disk by means of a magnet.

The pressure disk 35 is provided in the illustrated embodiment with two accurately plane-parallel support surfaces 35a and 35b and its outer diameter is smaller than the bearing bore of the bearing sleeve 33 at least by a slight amount so that after the disassembly of the rotating spindle part 32 it can be disassembled out of the spindle bearing housing. For that purpose, a simple assembly work tool 47 (FIG. 4) suffices if the pressure disk 35 consists of magnetizable material; the assembly work tool 47 consists of a handle rod 47a with a handle 47c and of a magnet 47b with slight retentive force which is threaded into the rod 47a.

In order to secure the pressure disk 35 during storage or transport of a completely assembled spindle bearing housing, it suffices, as illustrated in FIG. 5, to insert loosely a spacer rod 59a between a conventional closure cap 59 provided for such event and the pressure disk 35. The function of this spacer rod 59a also remains preserved if it is not accurately axially parallel, as shown in FIG. 5, but instead abuts laterally at any suitable place at the top against the roller bearing 31b and at the bottom against the extension part $31d_1$. It can also be appropriate to make the closure cap 59 and spacer rod 59a in one piece, for example, of synthetic resinous material.

Figure 6:
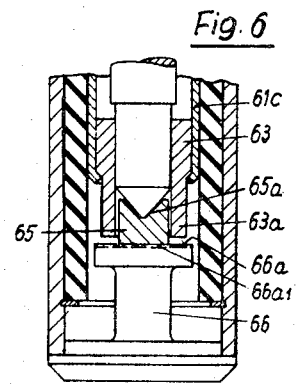
FIG. 6 is a partial longitudinal cross-sectional view through a footstep bearing with a pressure disk in accordance with the present invention which is provided with a concave support surface for the center or spindle shaft and is guided in the bearing bush.

In FIG. 6, the pressure disk 65 is guided with radial play in an extension part 63a of the bearing sleeve 63 and rests loosely on the support surface 66a of the support means 66. In order to facilitate the radial movements of the pressure disk provided with a concave support surface 65a for the center or spindle shaft, ring-shaped or radial grooves $66a_1$ are machined into the support surface 66a which serve as oil grooves. The guide sleeve 61c, which directly surrounds the bearing sleeve 63, may be constructed and arranged as to the rest as illustrated in FIG. 3; it may be however, also be constructed in a known manner as centering tube and may be connected in proximity of the collar bearing with the spindle bearing housing or with a separate bearing head or socket carrying the collar bearing and secured in the spindle bearing housing.

Figure 7:
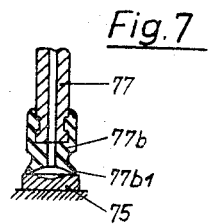
FIG. 7 is a partial cross-sectional view through the gripping head of an assembly tool similar to the one illustrated in FIG.

In FIG. 7, a suction cup 77b of elastic material is secured at an assembly tool 77 of which only the lower portion is illustrated. For the disassembly of the pressure disk, the assembly tool is inserted into the spindle bearing housing and is pressed against the pressure disk. As a result thereof, the lip edge $77b_1$ expands slightly outwardly and thereby is secured at the pressure disk 75 by suction effect. The suction effect is increased if at the upper end (not illustrated) of the tube 77, an elastic suction ball is arranged that is compressed manually in order to increase the vacuum and therewith the suction effect.

While I have shown and described only several embodiment in accordance with the present invention, it is understood that the same is not limited thereto but is susceptible of numerous changes and modifications as known to those skilled in the art. For example, the present invention is applicable not only to the illustrated spindle bearing supports but is also applicable to other bearing supports, for example, to footstep bearings in which the radial pressures are absorbed, not by friction bearing bushes, but by correspondingly arranged roller bearings; additionally, the present invention is equally applicable to step or thrust bearings whose bearing sockets are supported readily movable by known special measures. Thus, it is obvious that the present invention is not limited to the details shown and described herein, and I therefore do not wish to be limited thereto but intend to cover all such changes and modifications as known to those skilled in the art.

I claim:

1. A bearing support of spindles for spinning and twisting machines with a rotating spindle shaft adapted to be pulled out of a spindle housing, which includes a collar bearing means operable to absorb radial pressures and a footstep bearing means operable to absorb axial and radial pressures, characterized in that the bearing part of the footstep bearing means absorbing axial pressures is disengageably arranged in the spindle housing and is adapted to be displaced through the bearing bore of the collar bearing means, said bearing part comprising a loose pressure disk slidably supported with radial play, which has an external diameter that is smaller at least by a small amount than a bearing bore formed in the part of the footstep bearing means absorbing the radial pressures.

2. A bearing support according to claim 1, characterized in that the pressure disk is guided with radial play in guide means arranged at the part of the footstep bearing means absorbing the radial pressures.

3. A bearing support according to claim 2, characterized in that the guide means form an integral, unitary part with the part of the footstep bearing means absorbing the radial pressures.

4. A bearing support according to claim 2, characterized in that at least one of the two support surfaces of the pressure disk has concavely formed surfaces.

5. A bearing support according to claim 1, characterized in that the height of the rotating spindle shaft is adjustable by installation of a selected pressure disk having a different predetermined thickness.

6. A bearing support according to claim 1, characterized in that the pressure disk consists at least partially of magnetizable material and is retained during disassembly and/or assembly by a magnet arranged in an assembly tool.

7. A bearing support according to claim 1, characterized in that the pressure disk is retained during assembly and/or disassembly by a suction cup means arranged at an assembly tool.

8. A bearing support according to claim 1, characterized in that at least one of the support surfaces of the pressure disk has concavely formed surfaces.

9. A bearing support according to claim 1, characterized in that the pressure disk is retained in the footstep bearing means upon removal of the rotating spindle shaft by a securing means.

10. A bearing support according to claim 9, characterized in that said securing means is a spacer rod.

* * * * *